United States Patent
Okamura et al.

(10) Patent No.: US 7,869,233 B2
(45) Date of Patent: Jan. 11, 2011

(54) VOLTAGE CONVERSION DEVICE AND COMPUTER-READABLE RECORDING MEDIUM HAVING PROGRAM RECORDED THEREON FOR COMPUTER TO CONTROL VOLTAGE CONVERSION BY VOLTAGE CONVERSION DEVICE

(75) Inventors: Masaki Okamura, Toyota (JP); Takashi Yamashita, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 331 days.

(21) Appl. No.: 10/553,756

(22) PCT Filed: Jul. 12, 2004

(86) PCT No.: PCT/JP2004/010253
§ 371 (c)(1),
(2), (4) Date: Oct. 17, 2006

(87) PCT Pub. No.: WO2005/013467
PCT Pub. Date: Feb. 10, 2005

(65) Prior Publication Data
US 2007/0165432 A1 Jul. 19, 2007

(30) Foreign Application Priority Data
Jul. 31, 2003 (JP) .................. 2003-204768(P)

(51) Int. Cl.
*H02M 1/14* (2006.01)

(52) U.S. Cl. ................ 363/41; 323/222; 323/266
(58) Field of Classification Search .............. 323/266, 323/222, 259, 260, 225; 363/41, 65, 35
See application file for complete search history.

(56) References Cited

U.S. PATENT DOCUMENTS

| | | | |
|---|---|---|---|
| 5,373,195 A * | 12/1994 | De Doncker et al. | 307/45 |
| 5,883,484 A | 3/1999 | Akao | |
| 6,060,859 A | 5/2000 | Jonokuchi | |
| 6,580,253 B2 * | 6/2003 | Kanakubo et al. | 323/222 |
| 6,714,424 B2 * | 3/2004 | Deng et al. | 363/17 |
| 6,917,179 B2 | 7/2005 | Komatsu et al. | |
| 7,190,135 B2 * | 3/2007 | Collier-Hallman | 318/400.01 |
| 2005/0067999 A1 | 3/2005 | Okamura et al. | |

FOREIGN PATENT DOCUMENTS

| JP | A-08-214592 | 8/1996 |
|---|---|---|
| JP | A-11-113283 | 4/1999 |
| JP | A-2002-171606 | 6/2002 |

* cited by examiner

*Primary Examiner*—Harry Behm
(74) *Attorney, Agent, or Firm*—Oliff & Berridge, PLC

(57) ABSTRACT

A control device calculates a voltage command value of a voltage step-up converter based on a torque command value and a motor revolution number and calculates an on-duty of an NPN transistor based on the calculated voltage command value and a DC voltage from a voltage sensor. When the on-duty is influenced by a dead time of NPN transistors, control device fixes the on-duty at 1.0 to control the NPN transistors in such a manner that the voltage is increased or decreased.

14 Claims, 7 Drawing Sheets

VOLTAGE CONVERSION DEVICE AND COMPUTER-READABLE RECORDING MEDIUM HAVING PROGRAM RECORDED THEREON FOR COMPUTER TO CONTROL VOLTAGE CONVERSION BY VOLTAGE CONVERSION DEVICE

TECHNICAL FIELD

The present invention relates to a voltage conversion device and a computer-readable recording medium having a program recorded thereon for a computer to control voltage conversion by the voltage conversion device.

BACKGROUND ART

Hybrid vehicles have recently been of great interest as environment-friendly vehicles. The hybrid vehicles are now partially commercialized.

A hybrid vehicle has, as its motive power sources, a DC (direct current) power supply, an inverter and a motor driven by the inverter in addition to a conventional engine. More specifically, the engine is driven to secure the motive power source and a DC voltage from the DC power supply is converted by the inverter into an AC (alternating current) voltage to be used for rotating the motor and thereby securing the motive power source as well.

Regarding the hybrid vehicle, it has been proposed to boost the DC voltage from the DC power supply with a voltage step-up converter and supply the boosted DC voltage to the inverter which drives the motor (Japanese Patent Laying-Open No. 8-214592).

The voltage step-up converter is comprised of two NPN transistors connected in series between a power supply line and a ground line of the inverter and a reactor having one end connected to an intermediate point between the two NPN transistors and the other end connected to a power supply line of the power supply.

In the voltage step-up converter, the NPN transistor connected to the power supply line (upper arm) and the NPN transistor connected to the ground line (lower arm) are turned on/off at a predetermined duty ratio for boosting the DC voltage from the power supply to provide the boosted voltage to the inverter and for decreasing a DC voltage from the inverter to provide the decreased voltage to the power supply.

In view of the fact that the upper arm and the lower arm constituting the voltage step-up converter are connected in series between the power supply line and the ground line, it is necessary to prevent the upper arm and the lower arm from being simultaneously turned on. Then, control signals for controlling switching of the upper arm and the lower arm each include a dead time for preventing the simultaneous turn-on of the upper arm and the lower arm.

FIG. 7 is a timing chart of control signals controlling the upper arm and the lower arm. Referring to FIG. 7, the upper arm and the lower arm are turned on/off at a predetermined duty ratio in each control period T. If the upper arm having been turned off and the lower arm having been turned on are turned on and off respectively at timing t1, the upper arm and the lower arm could simultaneously be in the "on" state. Therefore, the lower arm is turned off at timing t1 and thereafter the upper arm is turned on at timing t2 later than timing t1 by a certain dead time.

When a voltage command value of the voltage step-up converter is considerably close to a power supply voltage, the on-duty of the upper arm (referring to the "on" period of the upper arm) is fairly high, 0.98 for example. In such a case, the on-duty of 0.98 is partially occupied, namely shortened by the dead time, and thus the period of time during which the upper arm should be in the on state cannot be secured.

FIGS. 8A and 8B are timing charts of the voltage and the on-duty of the upper arm. Referring to FIGS. 8A and 8B, it is supposed here that boosting of the voltage initially at power supply voltage Vb is started at timing t0. The voltage is accordingly increased from power supply voltage Vb. In the period from timing t0 to timing t1, the voltage command value is considerably close to power supply voltage Vb, so that the on-duty of the upper arm that is calculated based on the voltage command value is partially occupied by the dead time of the upper arm and the originally intended on-duty cannot be secured. Therefore, the on-duty of the upper arm is not controlled in a linear manner in the range between 1.0 and 0.95 and consequently oscillates (see FIG. 8B). Accordingly, the output voltage of the voltage step-up converter also oscillates (see FIG. 8A).

Then, when the on-duty of the upper arm that is calculated based on the voltage command value reaches for example 0.95, the on-duty is not partially occupied by the dead time and thus can be controlled in the linear manner.

As seen from the above, in the region where the voltage command value is considerably close to power supply voltage Vb, the on-duty of the upper arm is partially occupied by the dead time, so that the output voltage of the voltage step-up converter oscillates and accordingly the DC current from the power supply also oscillates. This could result in breakage of the power supply.

DISCLOSURE OF THE INVENTION

An object of the present invention is thus to provide a voltage conversion device that can suppress oscillations of an output voltage.

Another object of the present invention is to provide a computer-readable recording medium having a program recorded thereon for a computer to control voltage conversion that can suppress oscillations of an output voltage.

According to the present invention, a voltage conversion device variably changes an input voltage to be applied to an inverter which drives a motor, and includes a voltage converter and a control device. The voltage converter executes voltage conversion between a power supply and the inverter. The control device controls the voltage converter by fixing a duty in a case where a voltage command value of the voltage conversion is at least a power supply voltage and at most a predetermined voltage.

Preferably, the predetermined voltage is determined based on a dead time of the voltage converter.

Preferably, in a case where the control device controls the voltage converter to decrease an output voltage of the voltage converter, the control device fixes the duty when the voltage command value reaches a value of at least the power supply voltage and at most the predetermined voltage.

Preferably, the voltage converter variably changes the input voltage in a linear manner.

According to the present invention, a voltage conversion device variably changes an input voltage to be applied to an inverter which drives a motor, and includes a voltage converter and a control device. The voltage converter includes an upper arm turned on for a first on-duty and a lower arm turned on for a second on-duty determined by subtracting the first on-duty from 1, and executes voltage conversion between a power supply and the inverter by switching the upper arm and the lower arm. The control device controls, in a case where the first on-duty calculated based on a voltage command value of the voltage conversion by the voltage converter is influenced by a dead time of the upper arm and the lower arm, switching of the upper arm and the lower arm by fixing the first on-duty at an appropriate on-duty with influence of the dead time removed therefrom.

Preferably, the control device controls, in a case where the first on-duty calculated based on the voltage command value is larger than a maximum effective on-duty and smaller than a longest on-duty allowing the upper arm to be turned on continuously during a control period, switching of the upper arm and the lower arm by fixing the first on-duty at the appropriate on-duty. The maximum effective on-duty is determined by dividing by the control period an effective control period calculated by subtracting the dead time from the control period.

Preferably, the appropriate on-duty is the maximum effective on-duty or the longest on-duty.

Preferably, the voltage converter variably changes the input voltage in a linear manner.

According to the present invention, a computer-readable recording medium having a program recorded thereon for computer's execution is a computer-readable recording medium having a program recorded thereon for a computer to control voltage conversion by a voltage conversion device.

The voltage conversion device includes a voltage converter having an upper arm turned on for a first on-duty and a lower arm turned on for a second on-duty determined by subtracting the first on-duty from 1, and executes voltage conversion between a power supply and a load by switching the upper arm and the lower arm.

The program allows the computer to execute: a first step of calculating the first on-duty based on a voltage command value of the voltage conversion; a second step of determining whether or not the calculated first on-duty is influenced by a dead time of the upper arm and the lower arm; and a third step of controlling, when it is determined that the first on-duty is influenced by the dead time, switching of the upper arm and the lower arm by fixing the first on-duty at an appropriate on-duty.

Preferably, the second step includes: a first sub-step of calculating a maximum effective on-duty by using the dead time; a second sub-step of determining whether or not the calculated first on-duty is larger than the maximum effective on-duty and smaller than a longest on-duty allowing the upper arm to be turned on continuously during a control period; a third sub-step of determining that, when the first on-duty is larger than the maximum effective on-duty and smaller than the longest on-duty, the first on-duty is influenced by the dead time; and a fourth sub-step of determining that, when the first on-duty is at most the maximum effective on-duty or equal to the longest on-duty, the first on-duty is not influenced by the dead time. The maximum effective on-duty is determined by dividing by the control period an effective control period calculated by subtracting the dead time from the control period.

Preferably, in the third step, switching of the upper arm and the lower arm is controlled by fixing the first on-duty at the maximum effective on-duty or the longest on-duty.

With the voltage conversion device of the present invention, the duty for the voltage step-up control is fixed in a case where the voltage command value of the voltage conversion is at least the power supply voltage and at most a predetermined voltage.

Furthers with the voltage conversion device of the present invention, in a case where the on-duty of the upper arm that is calculated based on the voltage command value of the voltage conversion is influenced by the dead time of the upper arm and the lower arm, switching of the upper arm and the lower arm is controlled by fixing the on-duty of the upper arm at an appropriate on-duty from which the influence of the dead time is removed.

Thus, according to the present invention, oscillations of the output voltage from the voltage converter and the DC current from the power supply can be suppressed and consequently, breakage of the power supply can be prevented.

BEST MODES FOR CARRYING OUT THE INVENTION

Figure 1:
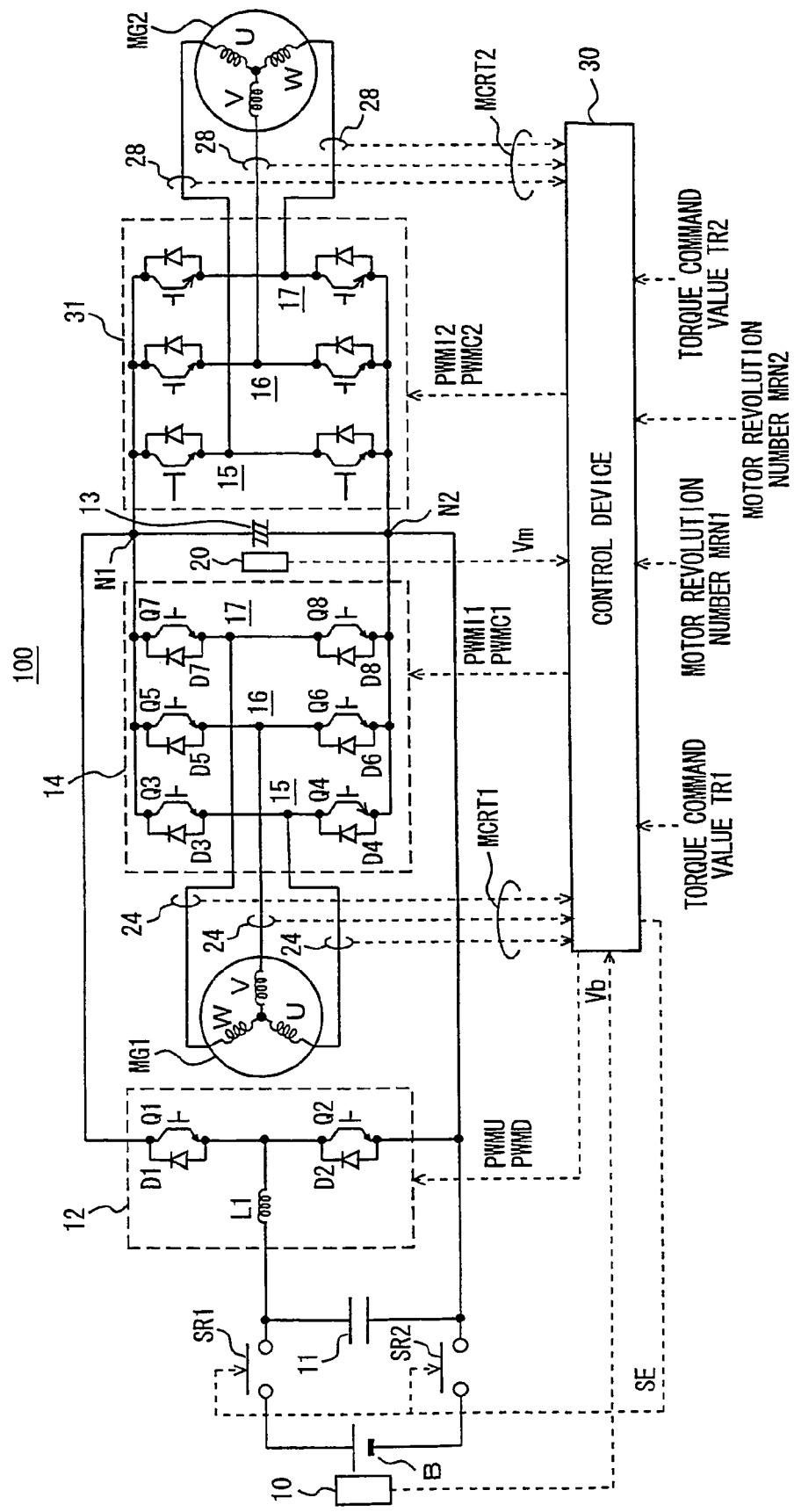
FIG. 1 is a schematic block diagram of a motor drive apparatus according to an embodiment of the present invention.

An embodiment of the present invention is hereinafter described in detail with reference to the drawings. Like components in the drawings are denoted by like reference characters and the description thereof is not repeated here.

Referring to FIG. 1, a motor drive apparatus 100 according to this embodiment of the present invention includes a DC power supply B, voltage sensors 10 and 20, system relays SR1 and SR2, capacitors 11 and 13, a voltage step-up converter 12, inverters 14 and 31, electric-current sensors 24 and 28, and a control device 30.

A motor generator MG1 is mounted for example on a hybrid vehicle. Motor generator MG1 is a motor that can function as an electric power generator connected to an engine (not shown) of the hybrid vehicle and driven by the engine and also function as an electric motor for the engine to start the engine for example. Through control that is exercised by adjusting the power generation torque of motor generator MG1 for keeping an efficient operational state of the engine, excellent fuel efficiency and exhaust gas emission can be achieved.

A motor generator MG2 is mounted for example on the hybrid vehicle. Motor generator MG2 is a drive motor for generating torque that drives the drive wheels of the hybrid vehicle. When motor generator MG2 is rotated by rotations of the drive wheels in a deceleration mode for example of the vehicle, motor generator MG2 can function as an electric power generator (so-called regenerative function).

Voltage step-up converter 12 includes a reactor L1, NPN transistors Q1 and Q2 and diodes D1 and D2. One end of reactor L1 is connected to a power supply line of DC power supply B and the other end is connected to an intermediate point between NPN transistors Q1 and Q2, namely between the emitter of NPN transistor Q1 and the collector of NPN transistor Q2. NPN transistors Q1 and Q2 are connected in series between the power supply line and a ground line. The collector of NPN transistor Q1 is connected to the power supply line while the emitter of NPN transistor Q2 is connected to the ground line. Between respective collectors and emitters of NPN transistors Q1 and Q2, diodes D1 and D2 for flowing current from respective emitters to respective collectors are connected.

Inverter 14 is comprised of a U phase arm 15, a V phase arm 16 and a W phase arm 17. U phase arm 15, V phase arm 16 and W phase arm 17 are connected in parallel between the power supply line and the ground line.

U phase arm 15 is comprised of series-connected NPN transistors Q3 and Q4, V phase arm 16 is comprised of series-connected NPN transistors Q5 and Q6 and W phase arm 17 is comprised of series-connected NPN transistors Q7 and Q8. Between respective collectors and emitters of NPN transistors Q3-Q8, diodes D3-D8 for flowing current from respective emitters to respective collectors are connected.

An intermediate point of each phase arm is connected to an end of each phase coil of motor generator MG1. Specifically, motor generator MG1 is a three-phase permanent-magnet motor configured of three coils of U, V and W phases respectively. One end of the U phase coil, one end of the V phase coil and one end of the W phase coil are connected at the common central junction, while the other end of the U phase coil is connected to an intermediate point between NPN transistors Q3 and Q4, the other end of the V phase coil is connected to an intermediate point between NPN transistors Q5 and Q6 and the other end of the W phase coil is connected to an intermediate point between NPN transistors Q7 and Q8.

Inverter 31 is configured identically to inverter 14.

DC power supply B is comprised of secondary or rechargeable cell(s), for example, of nickel hydride or lithium ion. Voltage sensor 10 detects DC voltage b (also referred to as "battery voltage Vb") which is output from DC power supply B to output the detected DC voltage Vb to control device 30.

System relays SR1 and SR2 are turned on/off in response to signal SE from control device 30.

Capacitor 11 smoothes DC voltage Vb supplied from DC power supply B to provide the smoothed DC voltage Vb to voltage step-up converter 12.

Voltage step-up converter 12 boosts the DC voltage Vb from capacitor 11 to supply the boosted voltage to capacitor 13. More specifically, receiving signal PWMU from control device 30, voltage step-up converter 12 increases the DC voltage Vb according to the period of time during which NPN transistor Q2 is turned on in response to signal PWMU, and supplies the increased voltage to capacitor 13.

Further, receiving signal PWMD from control device 30, voltage step-up converter 12 decreases a DC voltage supplied via capacitor 13 from inverter 14 and/or inverter 31 to charge DC power supply B.

Capacitor 13 smoothes the DC voltage from voltage step-up converter 12 to supply the smoothed DC voltage to inverters 14 and 31 via nodes N1 and N2. Voltage sensor 20 detects the terminal-to-terminal voltage of capacitor 13, namely output voltage Vm of voltage step-up converter 12 (corresponding to the input voltage to inverter 14, which is hereinafter applied as well) to output the detected output voltage Vm to control device 30.

Receiving the DC voltage supplied from capacitor 13, inverter 14 converts the DC voltage into an AC voltage based on signal PWMI1 from control device 30 to drive motor generator MG1. Accordingly, motor generator MG1 is driven to generate torque indicated by torque command value TR1.

In a regenerative braking mode of the hybrid vehicle having motor drive apparatus 100 mounted thereon, inverter 14 converts an AC voltage generated by motor generator MG1 into a DC voltage based on signal PWMC1 from control device 30 to supply the resultant DC voltage to voltage step-up converter 12 via capacitor 13. The regenerative braking here includes braking accompanied by regenerative power generation that is effected when a driver of the hybrid vehicle steps on the foot brake as well as deceleration (or stop of acceleration) accompanied by regenerative power generation that is effected when the driver releases the accelerator pedal without operating the foot brake.

Receiving the DC voltage from capacitor 13, inverter 31 converts the DC voltage based on signal PWMI2 from control device 30 into an AC voltage to drive motor generator MG2. Accordingly, motor generator MG2 is driven to generate torque indicated by torque command value TR2.

In the regenerative braking mode of the hybrid vehicle having motor drive apparatus 100 mounted thereon, inverter 31 converts an AC voltage generated by motor generator MG2 into a DC voltage based on signal PWMC2 from control device 30 to supply the resultant DC voltage to voltage step-up converter 12 via capacitor 13.

Current sensors 24 detect motor current MCRT1 flowing through motor generator MG1 to output the detected motor current MCRT1 to control device 30. Current sensors 28 detect motor current MCRT2 flowing through motor generator MG2 to output the detected motor current MCRT2 to control device 30.

Control device 30 receives from voltage sensor 10 DC voltage Vb which is output from DC power supply B, receives motor currents MCRT1 and MCRT2 from respective current sensors 24 and 28, receives from voltage sensor 20 output voltage Vm (namely the input voltage to inverters 14 and 31) of voltage step-up converter 12, and receives from an external ECU (Electrical Control Unit) torque command values TR1 and TR2 as well as motor revolution number (number of revolutions of the motor) MRN1 and motor revolution number MRN2. Control device 30 generates, based on output voltage Vm, motor current MCRT1 and torque command value TR1, signal PWMI1 or signal PWMC1 for controlling switching of NPN transistors Q3-Q8 of inverter 14 driving motor generator MG1, according to a method hereinlater described, and outputs the generated signal PWMI1 or PWMC1 to inverter 14.

Further, control device 30 generates, based on output voltage Vm, motor current MCRT2 and torque command value TR2, signal PWMI2 or signal PWMC2 for controlling switching of NPN transistors Q3-Q8 of inverter 31 driving motor generator MG2, according to a method hereinlater described, and outputs the generated signal PWMI2 or PWMC2 to invert 31.

Moreover, when inverter 14 (or 31) drives motor generator MG1 (or MG2), control device 30 generates, based on DC voltage Vb, output voltage Vm, torque command value TR1 (or TR2) and motor revolution number MRN1 (or MRN2), signal PWMU or signal PWMD for controlling switching of NPN transistors Q1 and Q2 of voltage step-up converter 12, according to a method hereinlater described, and outputs the generated signal to voltage step-up converter 12.

Moreover, control device 30 generates signal SE for turning on/off system relays SR1 and SR2 to output this signal to system relays SR1 and SR2.

Figure 2:
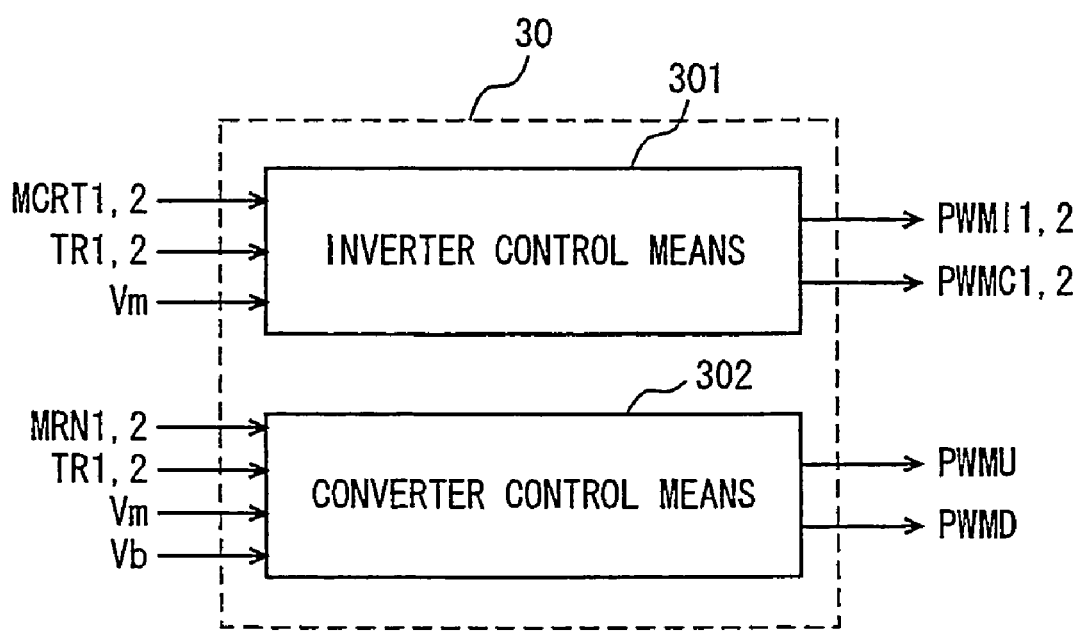
FIG. 2 is a functional block diagram of a control device shown in FIG. 1.

FIG. 2 is a functional block diagram of control device 30. Referring to FIG. 2, control device 30 includes inverter control means 301 and converter control means 302.

Inverter control means 301 generates signal PWMI1 or signal PWMC1 based on torque command value TR1, motor current MCRT1 and voltage Vm to output the generated signal to NPN transistors Q3-Q8 of inverter 14.

More specifically, based on voltage Vm, motor current MCRT1 and torque command value TR1, inverter control means 301 calculates the voltage to be applied to each phase of motor generator MG1 and generates, based on the calculated voltage, signal PWMI1 or PWMC1 for actually turning on/off NPN transistors Q3-Q8 each of inverter 14. Then, inverter control means 301 outputs the generated signal PWMI1 or PWMC1 to NPN transistors Q3-Q8 each of inverter 14.

Switching of NPN transistors Q3-Q8 each of inverter 14 is thus controlled so that current to be flown to each phase of motor generator MG1 is controlled for outputting the torque by motor generator MG1 according to the torque command. In this way, the motor drive current is controlled and the motor torque is output according to torque command value TR1.

Further, inverter control means 301 generates, based on voltage Vm, motor current MCRT2 and torque command value TR2, signal PWMI2 or signal PWMC2 by the above-described method to output the generated signal to NPN transistors Q3-Q8 of inverter 31.

Switching of NPN transistors Q3-Q8 each of inverter 31 is thus controlled so that current to be flown to each phase of motor generator MG2 is controlled for outputting the torque by motor generator MG2 according to the command. In this way, the motor drive current is controlled and the motor torque is output according to torque command value TR2.

Whether the operation mode of motor generator MG1 (or MG2) is powering, namely electric motor mode or regenerative, namely electric power generator mode is determined from the relation between torque command value TR1 (or TR2) and motor revolution number MRN1 (or MRN2). It is supposed here that the horizontal or x-axis of a rectangular coordinate system indicates motor revolution number MRN and the vertical or y-axis thereof indicates torque command value TR. Then, if the correlated torque command value TR1 (or TR2) and motor revolution number MRN1 (or N2) is in the first or second quadrant, the operation mode of motor generator MG1 (or MG2) is the powering mode. If the correlated torque command value TR1 (or TR2) and motor revolution number MRN1 (or MRN2) is in the third or fourth quadrant, the operation mode of motor generator MG1 (o MG2) is the regenerative mode.

Accordingly, inverter control means 301 generates, if it receives positive torque command value TR1 (or TR2), signal PWMI1 (or signal PWMI2) for driving motor generator MG1 (or MG2) as a drive motor to output the generated signal to NPN transistors Q3-Q8 of inverter 14 (or 31) and generates, if it receives negative torque command value TR1 (or TR2), signal PWMC1 (or signal PWMC2) for driving motor generator MG1 (or MG2) in the regenerative mode to output the generated signal to NPN transistors Q3-Q8 of inverter 14 (or 31).

Converter control means 302 generates signal PWMU or signal PWMD based on torque command value TR1 (or TR2), motor revolution number MRN1 (or MRN2), DC voltage Vb and voltage Vm, according to a method hereinlater described, to output the generated signal to NPN transistors Q1 and Q2 of voltage step-up converter 12.

Figure 3:
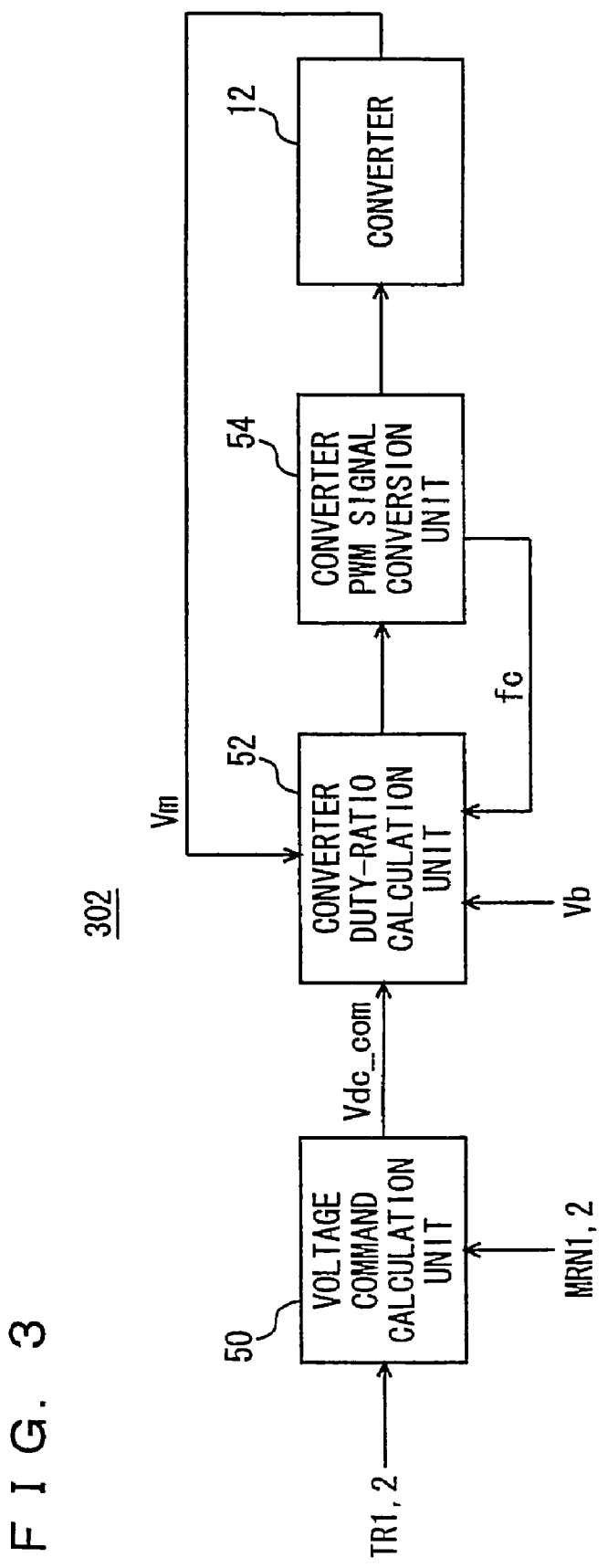
FIG. 3 is a functional block diagram of converter control means shown in FIG. 2.

FIG. 3 is a functional block diagram of converter control means 302 shown in FIG. 2. Referring to FIG. 3, converter control means 302 includes a voltage command calculation unit 50, a converter duty-ratio calculation unit 52 and a converter PWM signal conversion unit 54.

Voltage command calculation unit 50 calculates, based on torque command value TR1 (or TR2) and motor revolution number MRN1 (or MRN2) from the external ECU, an optimum value (target value) of the inverter input voltage, namely voltage command value Vdc_com of voltage step-up converter 12, and outputs the calculated voltage command value Vdc_com to converter duty-ratio calculation unit 52.

Converter duty-ratio calculation unit 52 calculates, based on voltage command Vdc_com from voltage command calculation unit 50 and DC voltage Vb from voltage sensor 10, on-duty D_ON_1 of NPN transistor Q1 of voltage step-up converter 12 according to expression (1).

$$D\_ON\_1 = Vb/Vdc\_com \quad (1)$$

Then, converter duty-ratio calculation unit 52 uses the calculated on-duty D_ON_1 to calculate on-duty D_ON_2 (=1−D_ON_1) of NPN transistor Q2.

Further, converter duty-ratio calculation unit 52 receives from converter PWM signal conversion unit 54 carrier frequency fc for controlling switching of NPN transistors Q1 and Q2 to calculate control period length T determined by the received carrier frequency fc. Converter duty-ratio calculation unit 52 holds dead time Dt of NPN transistors Q1 and Q2 and calculates maximum effective on-duty D_MAX of NPN transistor Q1 with influence of dead time Dt removed therefrom according to expression (2):

$$D\_MAX = (T-Dt)/T \quad (2)$$

where T−Dt represents an effective control period length determined by subtracting dead time Dt from control period length T.

Then, using expression (1), converter duty-ratio calculation unit 52 determines whether or not on-duty D_ON_1 calculated based on voltage command value Vdc_com is influenced by dead time Dt.

More specifically, converter duty-ratio calculation unit 52 determines whether or not the calculated on-duty D_ON_1 is larger than the maximum effective on-duty D_MAX and smaller than the longest on-duty (meaning that the on-duty is "1", which is hereinafter applied as well) that allows NPN transistor Q1 to continuously be turned on during control period length T. If on-duty D_ON_1 is larger than the maximum effective on-duty D_MAX and smaller than the longest on-duty, converter duty-ratio calculation unit 52 determines that on-duty D_ON_1 is influenced by dead time Dt. If on-duty D_ON_1 is equal to or smaller than the maximum effective on-duty D_MAX or equal to the longest on-duty, converter duty-ratio calculation unit 52 determines that on-duty D_ON_1 is not influenced by dead time Dt.

Then, in the case where converter duty-ratio calculation unit 52 determines that on-duty D_ON_1 is influenced by dead time Dt, converter duty-ratio calculation unit 52 sets on-duty D_ON_1 to the maximum effective on-duty D_MAX or the longest on-duty.

In contrast, in the case where converter duty-ratio calculation unit 52 determines that on-duty D_ON_1 is not influenced by dead time Dt, converter duty-ratio calculation unit 52 uses on-duty D_ON_1 calculated by expression (1).

Figure 4:
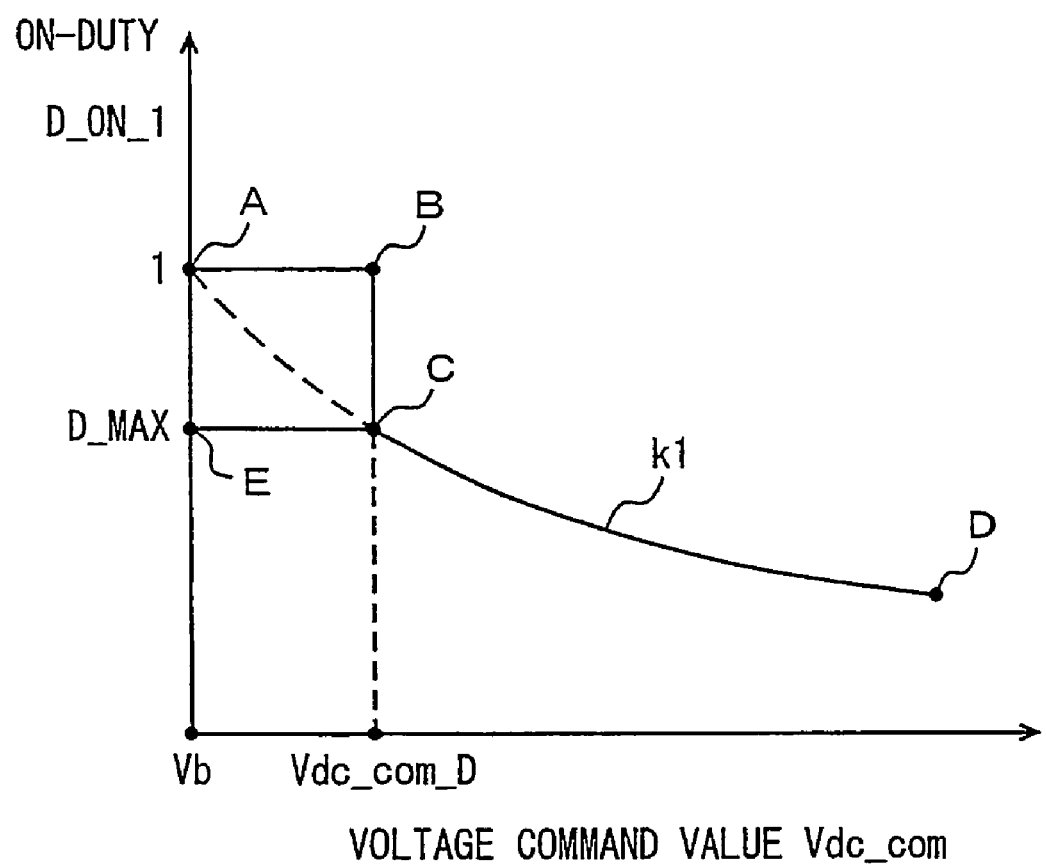
FIG. 4 shows a relation between on-duty D_ON_1 and voltage command value Vdc_com.

FIG. 4 shows a relation between on-duty D_ON_1 and voltage command value Vdc_com. Referring to FIG. 4, when voltage command value Vdc_com is equal to DC voltage Vb from DC power supply 10, on-duty D_ON_1 of NPN transistor Q1 is the longest on-duty. As voltage command value Vdc_corn increases to become larger than DC voltage Vb, on-duty D_ON_1 decreases in inverse proportion to voltage command value Vdc_com according to expression (1). In other words, on-duty D_ON_1 decreases along curve k1.

In the region where on-duty D_ON_1 is larger than the maximum effective on-duty D_MAX and smaller than the longest on-duty, on-duty D_ON_1 calculated based on voltage command value Vdc_com is partially occupied by dead time Dt and thus the intended on-duty cannot be secured. Then, in this case, on-duty D_ON_1 is set to the maximum effective on-duty D_MAX or the longest on-duty. In other words, in the region where voltage command value Vdc_com is equal to or larger than power supply voltage Vb and equal to or smaller than predetermined voltage Vdc_com_D (=Vb× T/(T−Dt)), on-duty D_ON_1 is set to the maximum effective on-duty D_MAX or the longest on-duty.

It is seen from equation Vdc_com_D=Vb×T/(T−Dt) that predetermined voltage Vdc_com_D is determined depending on the dead time.

In the above-described region, output voltage Vm of voltage step-up converter 12 oscillates and thus cannot be controlled in the linear manner with respect to voltage command value Vdc_com. Therefore, on-duty D_ON_1 is set to the on-duty (=1 or D_MAX) from which the influence of dead time Dt is removed.

Then, voltage command value Vdc_com reaches the value Vdc_com_D for which the linear control of output voltage Vm with respect to voltage command value Vdc_com can be conducted, and thereafter on-duty D_ON_1 and D_ON_2 calculated based on voltage command value Vdc_com are used.

Referring again to FIG. 3, according to the above-described method, converter duty-ratio calculation unit 52 calculates on-duty D_ON_1 and D_ON_2 of NPN transistors Q1 and Q2 and outputs, as a duty ratio, the ratio between on-duty D_ON_1 and on-duty D_ON_2 to converter PWM signal conversion unit 54.

Here, converter duty-ratio calculation unit 52 calculates deviation Vdc_com−Vm between voltage command value Vdc_com and voltage Vm from voltage sensor 20 and then determines the duty ratio in such a manner that the calculated deviation Vdc_com−Vm is zero.

Converter PWM signal conversion unit 54 generates, based on the duty ratio from converter duty-ratio calculation unit 52, signal PWMU or signal PWMD for turning on/off NPN transistors Q1 and Q2 of voltage step-up converter 12 and outputs the generated signal PWMU or PWMD to NPN transistors Q1 and Q2 of voltage step-up converter 12. Further, converter PWM signal conversion unit 54 outputs carrier frequency fc of the generated signal PWMU or PWMD to converter duty-ratio calculation unit 52.

The on-duty of NPN transistor Q2 which is the lower one included in voltage step-up converter 12 can be increased to increase electric-power storage of reactor L1, achieving a higher voltage output. In contrast, if the on-duty of the upper NPN transistor Q1 is increased, the voltage on the power supply line decreases. Accordingly, through control of the duty ratio of NPN transistors Q1 and Q2, the voltage on the power supply line can accordingly be controlled so that the voltage is set to an arbitrary voltage of at least the output voltage of DC power supply B.

Figure 5:
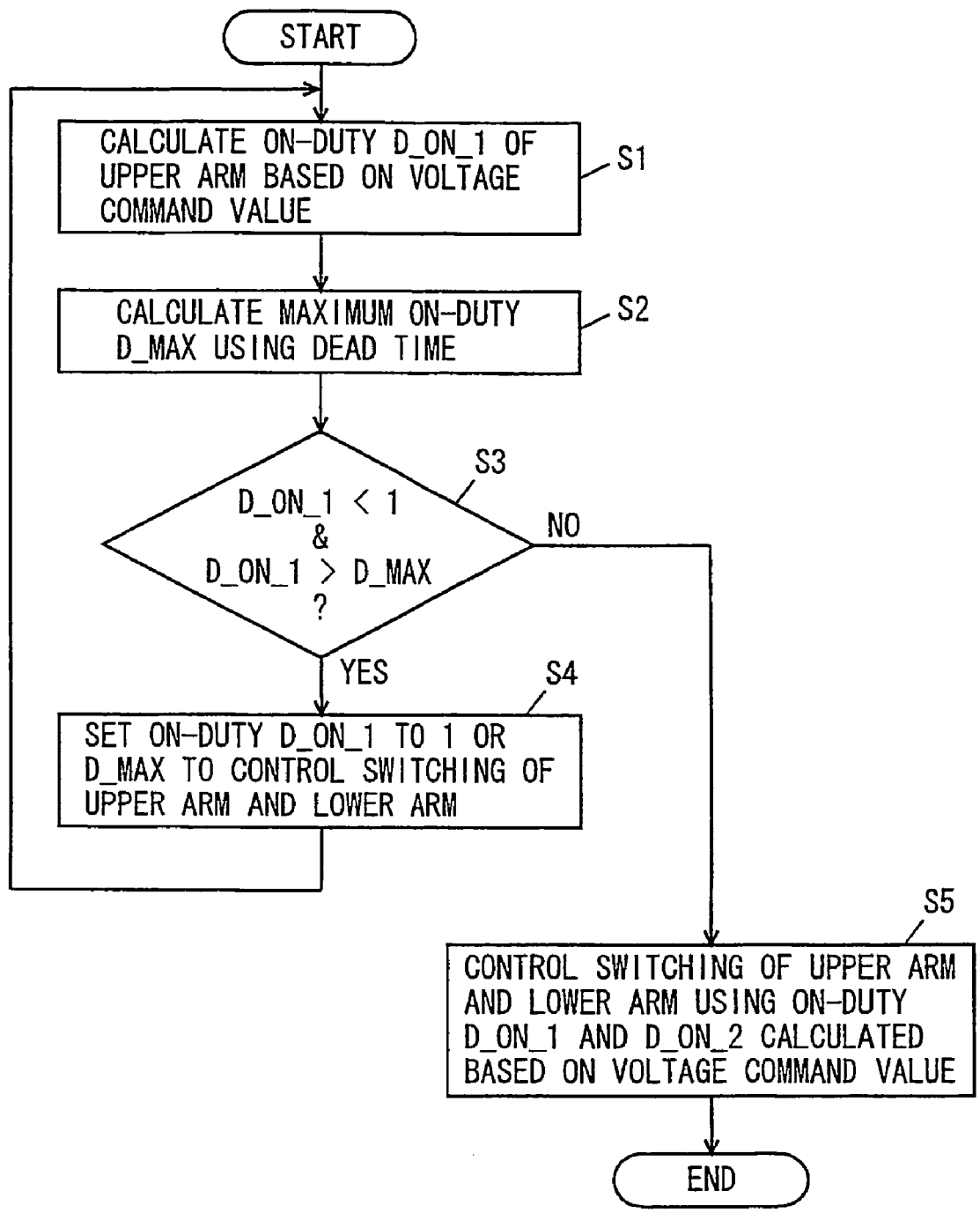
FIG. 5 is a flowchart illustrating operations of the converter control means controlling voltage conversion by a voltage step-up converter.

FIG. 5 is a flowchart illustrating operations of converter control means 302 that controls voltage conversion by voltage step-up converter 12. Referring to FIG. 5, on the start of a series of operations, converter duty-ratio calculation unit 52 calculates, based on voltage command value Vdc_com from voltage command calculation unit 50 and DC voltage Vb from voltage sensor 10, on-duty D_ON_1 of NPN transistor Q1 (upper arm) according to expression (1) (step S2).

Then, converter duty-ratio calculation unit 52 receives carrier frequency fc from converter PWM signal conversion unit 54 to calculate control period length T determined by the received carrier frequency fc. Converter duty-ratio calculation unit 52 substitutes control period length T and dead time Dt into expression (2) to calculate the maximum effective on-duty D_MAX (step S2).

Converter duty-ratio calculation unit 52 thereafter determines whether or not on-duty D_ON_1 is larger than the maximum effective on-duty D_MAX and smaller than the longest on-duty (step S3). In other words, converter duty-ratio calculation unit 52 determines whether or not on-duty D_ON_1 is influenced by dead time Dt.

If on-duty D_ON_1 is larger than the maximum effective on-duty D_MAX and smaller than the longest on-duty, converter duty-ratio calculation unit 52 determines that on-duty D_ON_1 is influenced by dead time Dt and sets on-duty D_ON_1 to the maximum effective on-duty D_MAX or the longest on-duty. Then, based on the set on-duty D_ON_1, converter duty-ratio calculation unit 52 calculates on-duty D_ON_2 (=1−D_ON_1).

Converter duty-ratio calculation unit 52 outputs to converter PWM signal conversion unit 54 the ratio between on-duty D_ON_1 (=1 or D_MAX) and on-duty D_ON_2 (=0 or 1−D_MAX) as the duty ratio.

Based on the duty ratio from converter duty-ratio calculation unit 52, converter PWM signal conversion unit 54 generates signal PWMU or signal PWMD to output the generated signal to NPN transistors Q1 and Q2. Accordingly, switching of NPN transistors Q1 and Q2 is controlled with on-duty D_ON_1 set to the longest on-duty or the maximum effective on-duty D_MAX (step S4).

After this, until on-duty D_ON_1 reaches the maximum effective on-duty D_MAX, on-duty D_ON_1 is fixed at the longest on-duty or the maximum effective on-duty D_MAX and steps S1 to S4 are repeatedly carried out. When on-duty D_ON_1 reaches the maximum effective on-duty D_MAX and it is determined in step S3 that on-duty D_ON_1 is equal to or smaller than the maximum effective on-duty D_MAX or equal to the longest on-duty, converter duty-ratio calculation unit 52 calculates the ratio between on-duty D_ON_1 and on-duty D_ON_2 calculated based on voltage command value Vdc_com as the duty ratio to output the calculated duty ratio to converter PWM signal conversion unit 54.

Converter PWM signal conversion unit 54 generates signal PWMU or signal PWMD based on the duty ratio from converter duty-ratio calculation unit 52 to output the generated signal to NPN transistors Q1 and Q2. Accordingly, switching of NPN transistors Q1 and Q2 is controlled using on-duty D_ON_1 and on-duty D_ON_2 calculated based on voltage command value Vdc_com (step S5).

The series of operations are accordingly completed.

Figure 6A:
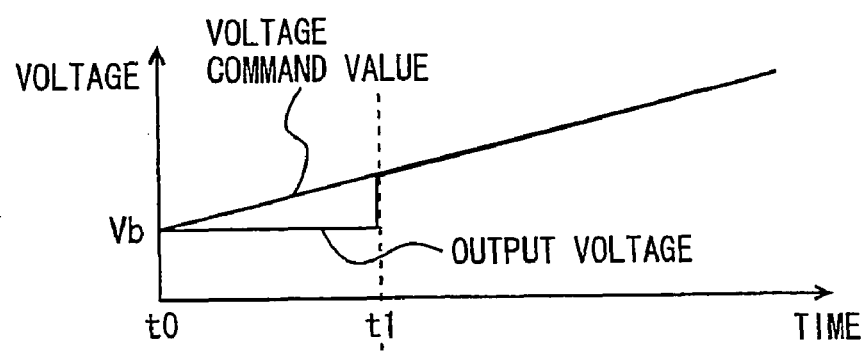
FIGS. 6A and 6B are timing charts of voltage and on-duty D_ON_1 of an NPN transistor Q1 (upper arm).
Figure 6B:
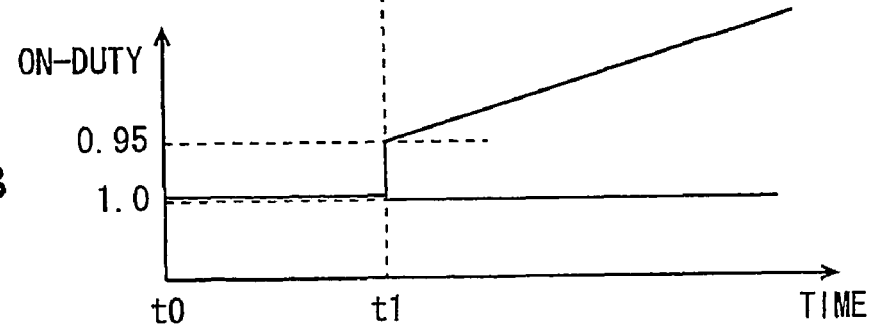
Figure 7:
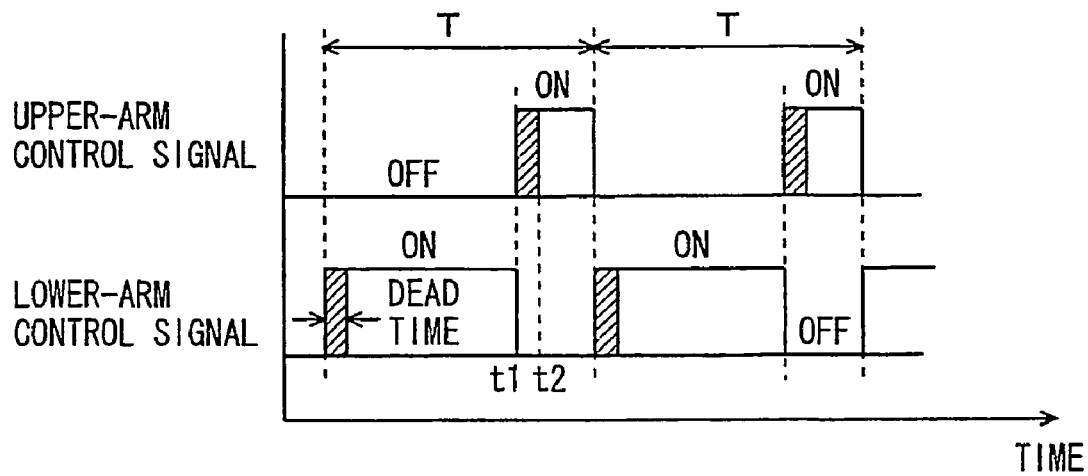
FIG. 7 is a timing chart of control signals controlling the upper and lower arms.
Figure 8A:
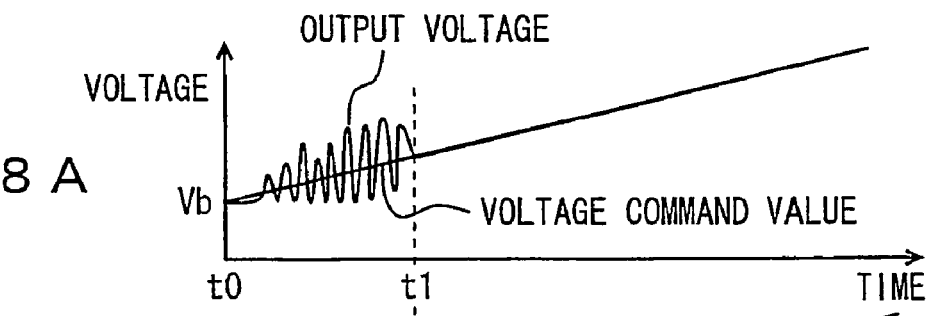
FIGS. 8A and 8B are timing charts of voltage and on-duty of an upper arm.
Figure 8B:
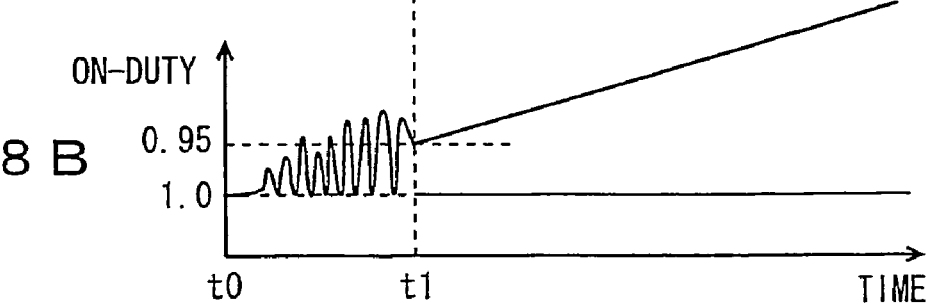

FIGS. 6A and 6B are timing charts of the voltage and the on-duty of NPN transistor Q1 (upper arm). Referring to FIGS. 6A and 6B, in the case where the voltage step-up or boosting operation is carried out following the flowchart shown in FIG. 5, voltage command value Vdc_com starts to increase at timing t0. In the period from timing to timing t1, voltage command value Vdc_com is considerably close to DC voltage Vb from DC power supply B. On-duty D_ON_1 which is calculated based on voltage command value Vdc_com is accordingly influenced by dead time Dt (this condition corresponds to the case where the determination is "Yes" in step S3 of FIG. 5).

Thus, in the period from timing t0 to timing t1, on-duty D_ON_1 is fixed at the longest on-duty (D_ON_1=1.0) from which the influence of dead time Dt is removed (see FIG. 6B). In this case, while output voltage Vm of voltage step-up converter 12 deviates from voltage command value Vdc_com, on-duty D_ON_1 is fixed at the longest on-duty. Then, in the state where on-duty D_ON_1 is fixed at the longest on-duty, the voltage step-up operation is carried out (this condition corresponds to the case where steps S1-S4 are repeatedly carried out until the determination of "No" is made in step S3 of FIG. 5).

Output voltage Vm is accordingly held at DC voltage Vb in the period from timing t0 to timing t1 (see FIG. 6A).

Voltage command value Vdc_com thereafter increases so that on-duty D_ON_1 calculated based on this voltage command Vdc_com reaches for example 0.95. Then, on-duty D_ON_1 is not influenced by dead time Dt. Therefore, the voltage step-up operation is carried out using on-duty D_ON_1 and on-duty D_ON_2 calculated based on voltage command value Vdc_com (corresponding to S5 of FIG. 5).

If the voltage step-up operation intends to make output voltage Vm closer to DC voltage Vb, on-duty D_ON_1 is fixed at the longest on-duty in the period from timing t0 to timing t1 and changed linearly in other periods based on voltage command value Vdc_com.

Regarding FIGS. 6A and 6B, on-duty D_ON_1 may be fixed at the maximum effective on-duty D_MAX in the period from timing t0 to timing t1.

In this way, converter control means 302 controls switching of NPN transistors Q1 and Q2 for both of the operation of increasing the voltage and the operation of decreasing the voltage. Specifically, if on-duty D_ON_1 of NPN transistor Q1 calculated based on voltage command value Vdc_com is influenced by dead time Dt, switching of NPN transistors Q1 and Q2 is controlled using on-duty D_ON_1 fixed at the on-duty (the longest on-duty or the maximum effective on-duty D_MAX) with influence of dead time Dt removed therefrom. If on-duty D_ON_1 is not influenced by dead time Dt, switching of NPN transistors Q1 and Q2 is controlled using on-duty D_ON_1 and on-duty D_ON_2 calculated based on voltage command value Vdc_com.

In the case where switching of NPN transistors Q1 and Q2 is controlled using on-duty D_ON_1 fixed at the longest on-duty, converter control means 302 changes the on-duty along the path through point A, point B, point C and point D shown in FIG. 4. In the case where switching of NPN transistors Q1 and Q2 is controlled using on-duty D_ON_1 fixed at the maximum effective on-duty D_MAX, converter control means 302 changes the on-duty along the path through point A, point E, point C and point D.

Accordingly, as shown in FIGS. 6A and 6B, even in the region where the boosting ratio of DC voltage Vb approaches 1.0, namely voltage command value Vdc_com approaches DC voltage Vb, disturbance of output voltage Vm from voltage step-up converter 12 and DC current Ib from DC power supply B can be suppressed.

The maximum effective on-duty D_MAX is determined by expression (2). The maximum effective on-duty D_MAX may be changed depending on carrier frequency fc since control period length T in expression (2) is determined by carrier frequency fc for controlling switching of NPN transistors Q1 and Q2.

Further, since the switching loss of NPN transistors Q1 and Q2 has a connection with carrier frequency fc, the maximum effective on-duty D_MAX may be determined in consideration of carrier frequency fc and the switching loss.

Moreover, if motor drive apparatus 100 shown in FIG. 1 is mounted on a hybrid vehicle, motor generator MG1 is coupled to the engine via a power split device and motor generator MG2 is coupled to the front wheels (drive wheels) via the power split device. Voltage step-up converter 12 decreases the voltage in the following cases. Specifically, in a case where the brake pedal is stepped on while the hybrid vehicle is running so that motor generator MG1 is stopped and the voltage supplied to motor generator MG2 decreases and in a case where power generation by motor generator MG1 is stopped while the hybrid vehicle is running at a low speed so that the voltage supplied to motor generator MG2 decreases, voltage is decreased by voltage step-up converter 12. In such cases, converter control means 302 controls voltage step-up converter 12 in such a manner that output voltage Vm is decreased to voltage command value Vdc_com by changing on-duty D_ON_1 along the path through point D, point C, point B and point A or the path through point D, point C, point E and point A shown in FIG. 4. Accordingly, even if the hybrid vehicle is running in a deceleration mode or a low-speed mode, oscillations of output voltage Vm and DC current Ib can be suppressed and breakage of DC power supply B can be prevented.

The control of voltage conversion by converter control means 302 of control device 30 is actually conducted by a CPU (Central Processing Unit). The CPU reads from a ROM (Read Only Memory) a program having the steps of the flowchart shown in FIG. 5 to execute the read program for controlling the voltage conversion following the flowcharts shown in FIG. 5. The ROM thus corresponds to a computer (CPU)-readable recording medium having the program recorded thereon that has the steps of the flowchart in FIG. 5.

"Voltage conversion device" here is comprised of voltage step-up converter 12 and control device 30.

Here, "upper arm" is comprised of NPN transistor Q1 and "lower arm" is comprised of NPN transistor Q2.

The longest on-duty (on-duty of "1") or the maximum effective on-duty D_MAX means "appropriate on-duty".

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applied to a voltage conversion device that can suppress oscillations of an output voltage. The present invention is also applied to a computer-readable recording medium having a program recorded thereon for a computer to control voltage conversion that can suppress oscillations of an output voltage.

The invention claimed is:

1. A voltage conversion device variably changing an input voltage to be applied to an inverter driving a motor, comprising:
   a voltage converter executing voltage conversion between a power supply and said inverter; and
   a control device controlling a switching duty of an upper arm and a lower arm included in said voltage converter so that an influence of a dead time of said voltage converter is removed, when a voltage command value of said voltage conversion is at least a power supply voltage and at most a predetermined voltage, wherein
   said predetermined voltage is a minimum voltage that can secure the dead time of said voltage converter and is determined based on the dead time, the power supply voltage and a control period length, and
   said control device controls said voltage converter by fixing said switching duty when said voltage command value is at least said power supply voltage and at most said predetermined voltage.

2. The voltage conversion device according to claim 1, wherein
said voltage converter linearly changes said input voltage.

3. A voltage conversion device variably changing an input voltage to be applied to an inverter driving a motor, comprising:
a voltage converter executing voltage conversion between a power supply and said inverter; and
a control device controlling a switching duty of an upper arm and a lower arm included in said voltage converter so that an influence of a dead time of said voltage converter is removed, when a voltage command value of said voltage conversion is at least a power supply voltage and at most a predetermined voltage, wherein
said predetermined voltage is a product of the power supply voltage and a control period length, divided by an effective control period length, the effective control period length being determined by subtracting the dead time from the control period length, and
said control device controls said voltage converter by fixing said switching duty when said voltage command value is at least said power supply voltage and at most said predetermined voltage.

4. The voltage conversion device according to claim 3, wherein
in a case where said control device controls said voltage converter to decrease an output voltage of said voltage converter, said control device fixes said switching duty when said voltage command value reaches a value of at least said power supply voltage and at most said predetermined voltage.

5. The voltage conversion device according to claim 3, wherein
said voltage converter linearly changes said input voltage.

6. A voltage conversion device variably changing an input voltage to be applied to an inverter driving a motor, comprising:
a voltage converter executing voltage conversion between a power supply and said inverter; and
a control device controlling a switching duty of an upper arm and a lower arm included in said voltage converter so that an influence of a dead time of said voltage converter is removed, when a voltage command value of said voltage conversion is at least a power supply voltage and at most a predetermined voltage, wherein
said predetermined voltage is a product of the power supply voltage and a control period length, divided by an effective control period length, the effective control period length being determined by subtracting the dead time from the control period length, and
when said control device controls said voltage converter to decrease an output voltage of said voltage converter, said control device fixes said switching duty when said voltage command value reaches a value of at least said power supply voltage and at most said predetermined voltage.

7. A voltage conversion device variably changing an input voltage to be applied to an inverter driving a motor, comprising:
a voltage converter including an upper arm turned on for a first on-duty and a lower arm turned on for a second on-duty determined by subtracting said first on-duty from 1, and executing voltage conversion between a power supply and said inverter by switching said upper arm and said lower arm; and
a control device controlling said first on-duty to remove an influence of a dead time when said first on-duty calculated based on a voltage command value of the voltage conversion by said voltage converter is influenced by said dead time of said upper arm and said lower arm, wherein
said control device controls switching of said upper arm and said lower arm by fixing said first on-duty at said appropriate on-duty, when said first on-duty calculated based on said voltage command value is larger than a maximum effective on-duty and smaller than a longest on-duty allowing said upper arm to be turned on continuously during a control period, and
said maximum effective on-duty is determined by dividing an effective control period, calculated by subtracting said dead time from said control period, by said control period.

8. The voltage conversion device according to claim 7, wherein
said control device controls switching of said upper arm and said lower arm by fixing said first on-duty when said first on-duty calculated based on said voltage command value is influenced by said dead time.

9. The voltage conversion device according to claim 8, wherein
said voltage converter linearly changes said input voltage.

10. The voltage conversion device according to claim 7, wherein
said appropriate on-duty is said maximum effective on-duty or said longest on-duty.

11. The voltage conversion device according to claim 7, wherein
said voltage converter linearly changes said input voltage.

12. A computer-readable recording medium having a program recorded thereon for a computer to control voltage conversion by a voltage conversion device,
said voltage conversion device including a voltage converter having an upper arm turned on for a first on-duty and a lower arm turned on for a second on-duty determined by subtracting said first on-duty from 1, and executing voltage conversion between a power supply and an inverter by switching said upper arm and said lower arm, and
said program allowing said computer to execute:
a first step of calculating said first on-duty based on a voltage command value of said voltage conversion;
a second step of determining whether said calculated first on-duty is influenced by a dead time of said upper arm and said lower arm;
a first sub-step of calculating a maximum effective on-duty by using said dead time;
a second sub-step of determining if said calculated first on-duty is larger than said maximum effective on-duty and smaller than a longest on-duty and allowing said upper arm to be turned on continuously during a control period based on said determination;
a third sub-step of determining if said first on-duty is influenced by said dead time, when said first on-duty is larger than said maximum effective on-duty and smaller than said longest on-duty, and
a fourth sub-step of determining if said first on-duty is not influenced by said dead time, when said first on-duty is at most said maximum effective on-duty or equal to said longest on-duty, and
said maximum effective on-duty is determined by dividing an effective control period, calculated by subtracting said dead time from said control period, by said control period, and a third step of controlling said first on-duty to be an appropriate on-duty when said first on-duty is influenced by said dead time.

13. The computer-readable recording medium according to claim 12, wherein
in said third step, switching of said upper arm and said lower arm is controlled by fixing said first on-duty at said appropriate on-duty.

14. The computer-readable recording medium according to claim 12, wherein
in said third step, switching of said upper arm and said lower arm is controlled by fixing said first on-duty at said maximum effective on-duty or said longest on-duty.

* * * * *